United States Patent
Nguyen et al.

(10) Patent No.: US 12,113,254 B1
(45) Date of Patent: Oct. 8, 2024

(54) COMBINED HYDROGEN SUPPLY AND FUEL CELL PROCESSES FOR INCREASED EFFICIENCY OF ELECTRICITY GENERATION

(71) Applicant: Halliburton Energy Services, Inc., Houston, TX (US)

(72) Inventors: Philip D. Nguyen, Houston, TX (US); Stanley Vernon Stephenson, Duncan, OK (US); Ronald Glen Dusterhoft, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/197,493

(22) Filed: May 15, 2023

(51) Int. Cl.
*E21B 43/26* (2006.01)
*C01B 3/26* (2006.01)
(Continued)

(52) U.S. Cl.
CPC ............. *H01M 8/0612* (2013.01); *C01B 3/26* (2013.01); *E21B 43/2607* (2020.05);
(Continued)

(58) Field of Classification Search
CPC ....... E21B 43/26; E21B 43/2607; C01B 3/26; C01B 2203/0277; C01B 2203/066;
(Continued)

(56) References Cited

U.S. PATENT DOCUMENTS

| 5,650,132 A * | 7/1997 | Murata ..................... C01B 3/26 |
| | | 423/445 B |
| 6,200,697 B1 | 3/2001 | Pesavento |
| | (Continued) | |

FOREIGN PATENT DOCUMENTS

| JP | 2009179541 A | 8/2009 |
| WO | 2006050335 A2 | 5/2006 |
| | (Continued) | |

OTHER PUBLICATIONS

International Search Report and Written Opinion for International Patent Application No. PCT/US2024/012627 dated May 28, 2024. PDF file. 8 pages.

*Primary Examiner* — Matthew R Buck
(74) *Attorney, Agent, or Firm* — Thomas Rooney; C. Tumey Law Group, PLLC

(57) ABSTRACT

Provided are methods and systems for combining hydrogen supply and fuel cell processes for increased efficiency of electricity generation. The method may include decomposing methane to produce at least hydrogen, introducing at least a portion of the hydrogen to a fuel cell to generate at least electricity and heat, and capturing at least a portion of the heat from the fuel cell to reduce an electricity requirement for the methane decomposition. The system may include a methane preheater, a reaction system, a hydrogen storage system, a hydrogen fuel cell, and a heat recovery unit. The reaction system may comprise one or more reaction chambers containing a liquid base fluid, carrier droplets and a catalyst, wherein the reaction system is configured to decompose methane. The heat recovery unit may be configured to supply waste heat from the hydrogen fuel cell to the methane preheater.

18 Claims, 3 Drawing Sheets

(51) Int. Cl.
  *F04B 17/03*     (2006.01)
  *H01M 8/04007*   (2016.01)
  *H01M 8/04082*   (2016.01)
  *H01M 8/0612*    (2016.01)

(52) U.S. Cl.
  CPC ... *H01M 8/04007* (2013.01); *H01M 8/04201* (2013.01); *C01B 2203/0277* (2013.01); *C01B 2203/066* (2013.01); *C01B 2203/1241* (2013.01); *F04B 17/03* (2013.01)

(58) Field of Classification Search
  CPC ...... C01B 2203/1241; H01M 8/04007; H01M 8/04201; H01M 8/0612; F04B 17/03
  See application file for complete search history.

(56) References Cited

U.S. PATENT DOCUMENTS

| | | | |
|---|---|---|---|
| 6,465,118 B1 * | 10/2002 | Dickman | H01M 8/04007 |
| | | | 429/442 |
| 6,923,948 B2 * | 8/2005 | Baumann | H01M 8/0612 |
| | | | 252/373 |
| 7,794,690 B2 | 9/2010 | Abatzoglou et al. | |
| 7,799,472 B2 | 9/2010 | Gür | |
| 8,138,380 B2 | 3/2012 | Olah et al. | |
| 8,212,088 B2 | 7/2012 | Olah et al. | |
| 8,679,444 B2 | 3/2014 | Noyes | |
| 9,221,685 B2 | 12/2015 | Noyes | |
| 9,564,650 B2 | 2/2017 | Harjes et al. | |
| 9,783,416 B2 | 10/2017 | Noyes | |
| 10,047,446 B2 | 8/2018 | Kaczur et al. | |
| 10,577,910 B2 * | 3/2020 | Stephenson | F04B 17/03 |
| 10,763,523 B2 * | 9/2020 | Jahnke | H01M 8/04111 |
| 11,131,028 B2 | 9/2021 | Kaczur et al. | |
| 11,198,923 B2 | 12/2021 | Giri et al. | |
| 11,548,782 B1 | 1/2023 | Nguyen et al. | |
| 2005/0003247 A1 | 1/2005 | Pham | |
| 2008/0145726 A1 | 6/2008 | Nagasaka et al. | |
| 2009/0291335 A1 | 11/2009 | Anzai | |
| 2010/0038082 A1 | 2/2010 | Zubrin et al. | |
| 2014/0242493 A1 | 8/2014 | Irvine et al. | |
| 2021/0061654 A1 * | 3/2021 | McFarland | B01J 27/08 |

FOREIGN PATENT DOCUMENTS

| | | |
|---|---|---|
| WO | 2020223489 A1 | 11/2020 |
| WO | 2021077164 A1 | 4/2021 |

* cited by examiner

COMBINED HYDROGEN SUPPLY AND FUEL CELL PROCESSES FOR INCREASED EFFICIENCY OF ELECTRICITY GENERATION

BACKGROUND

During the drilling and completion of oil and gas wells, various wellbore treatments are performed on the wells for a number of purposes. For example, hydrocarbon-producing wells are often stimulated by hydraulic fracturing operations, wherein a servicing fluid such as a fracturing fluid may be introduced into a portion of a subterranean formation penetrated by a wellbore at a hydraulic pressure sufficient to create or enhance fractures therein. Such a fracturing treatment may increase hydrocarbon production from the well.

At a well stimulation site, there are typically several large pieces of fracturing (or other well stimulation) equipment on location that must be powered including, but not limited to, a gel mixer, liquid handling equipment, sand handling equipment, a blender, a plurality of high-pressure hydraulic pumping units, and a control center. The equipment on location is used to deliver large quantities of fluid/proppant mixtures to a wellhead at high-pressures to perform the desired operations. Often, the hydraulic pumping units and other machinery on location are powered by diesel engines. In general, these diesel engines operate at relatively low efficiencies (e.g., approximately 32%). The stimulation site will often include several individual diesel-powered units (e.g., pumping units, blenders, etc.) that must be refueled multiple times a day throughout a multi-stage stimulation operation.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
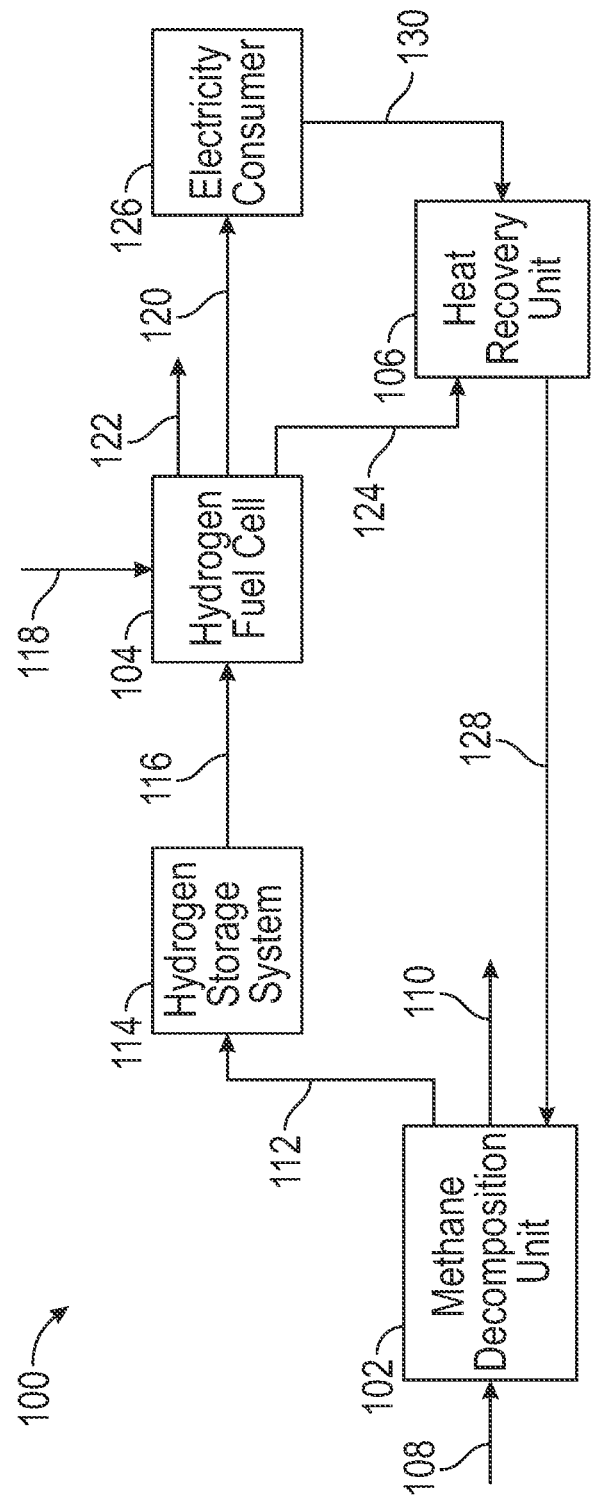
FIG. 1 is a schematic illustration of a system in accordance with some embodiments of the present disclosure.

Methane gas ($CH_4$) can be released from the wellhead. In accordance with present embodiments, this methane can be used as a source of hydrogen to power fuel cells on a wellsite. Membrane separators, and/or MOFs, can be used to separate and purify methane from other gas components. A fuel cell is an electrochemical device that converts the chemical energy from a gas (e.g., hydrogen) and an oxidizing agent (e.g., oxygen) into electricity through a pair of redox chemical reactions. Captured methane can be converted into hydrogen gas and solid carbon. In this case, the hydrogen gas may be referred to "green hydrogen" because essentially no carbon dioxide or carbon monoxide is produced during the conversion process. However, methane pyrolysis or the thermal decomposition of methane into hydrogen and solid carbon typically requires operating temperatures over 1,000° C.

The present disclosure relates to improved efficiency of electricity generation from fuel cells using methane as a hydrogen source, and more particularly, embodiments relate to recovering waste heat from the fuel cells as a heat source in methane decomposition. For example, the waste heat from electricity generation may be used to pre-heat the methane inlet and/or pre-heat at least one or more reaction chambers converting the captured methane into hydrogen gas and solid carbon. Further, the heat produced by the hydraulic pumping units and other machinery on location to pump hydraulic fracturing fluids downhole can also be recovered to pre-heat the methane inlet and pre-heat the at least one or more reaction chambers that convert the captured methane into hydrogen gas and solid carbon.

Therefore, the system in accordance with some embodiments of the present disclosure comprises a reaction system for decomposition of methane to hydrogen and a fuel cell for generation of electricity from at least a portion of the hydrogen, and waste heat recovery unit for recovering waste heat from the fuel cell for use as a heat source in the methane decomposition. In some embodiments, the reaction system may comprise one or more reaction chambers that contain a catalyst. The methane may react in the one or more reaction chambers with the catalyst to produce, for example, hydrogen and solid carbon. At least a portion of the hydrogen may be provided to the fuel cell to generate electricity. At least a portion of the heat generated in the fuel cell may be recovered in the waste recovery unit, for example, to reduce the heat requirement for the methane decomposition. In some embodiments, the recovered heat may be used to preheat the methane and/or heat the one or more reaction chambers. In some embodiments, the electricity generated in the fuel cell may be used to power, for example, oilfield equipment. In some embodiments, the electricity generated in the fuel cell may be used to power one or more pumps that in turn drive a fracturing fluid into a wellbore. At least a portion of the heat generated by the one or more pumps may also be captured and used to further reduce the heat requirement of the methane decomposition.

In one or more embodiments, the system of the present disclosure uses methane pyrolysis or any suitable processes for methane decomposition. Methane pyrolysis includes heating methane above its decomposition temperature to break the C—H bonds into solid carbon and hydrogen gas. It is a one step process at relatively low cost as compared to steam methane reforming including carbon sequestration. In steam methane reforming, methane is fed into a reactor along with steam and contacts a catalyst to react to form hydrogen, carbon dioxide ($CO_2$), and carbon monoxide (CO). Steam methane reforming requires high operating temperatures in the range of 800° C. to 900° C., for example, to break the hydrogen bonds of the methane and relies on expensive materials as catalyst. If the $CO_2$ and CO by-products from steam methane reforming are captured and stored underground, then the produced hydrogen is coded as "blue hydrogen." If the $CO_2$ and CO are not captured and stored underground, then the produced hydrogen is coded as "gray hydrogen." Approximately 95% of all hydrogen in the United States of America and 50% globally is generated today by a steam methane reforming process. In an effort to decarbonize hydrogen production, carbon capture and storage (CCS) methods are being implemented within the industry, which have the potential to remove up to 90% of $CO_2$ produced from the steam methane reforming process.

However, there are several disadvantages to steam methane reforming. First, steam methane reforming produces approximately 7 kilograms (kg) of $CO_2$ per 1 kg of hydrogen produced and accounts for about 3% of global industrial sector $CO_2$ emissions. Second, steam methane reforming requires such high reactor temperatures that several safety issues are present. Third, steam methane reforming can be very expensive ranging from $1 to over $3 per kilogram of hydrogen produced. Lastly, despite carbon capture and storage efforts to capture and store the carbon dioxide by-product, the implementation of this technology remains problematic, costly, and increases the price of the produced hydrogen significantly.

Methane pyrolysis operates at even higher temperatures. The non-catalytic dissociation of methane into methylene and a hydrogen molecule is observed in experiments at temperatures above 1400° C., while the non-catalytic decomposition of methane into a methyl radical and a hydrogen atom is observed in experiments at temperatures below 1400° C. In contrast with methane reforming, there is no need to capture and store carbon dioxide and carbon monoxide in methane pyrolysis as methane is converted into green hydrogen and solid carbon. Green hydrogen can be produced in large quantities for industries such as ammonia plants and refineries, but also to power hydrogen fuel cells. The solid carbon produced from methane pyrolysis can be used as a fuel source in direct carbon fuel cells (DCFC) for wellsite equipment. It can also be used in the manufacture of carbon ion batteries for wellbore equipment. Carbon ion batteries are more reliable and have fewer safety concerns compared to other common batteries such as lithium batteries. Solid carbon can also be used for soil amendment and environmental remediation. Further, the sale of solid carbon improves the economics of the methane pyrolysis process.

The noncatalytic decomposition of methane involves a free-radical scheme with the initiating reaction step corresponding to the dissociation of methane into a methyl radical and a hydrogen atom and formation of ethane and hydrogen molecules. In the second step, the rate of ethane formation falls gradually toward a plateau, and ethylene is obtained as a secondary product via the radical chain dehydrogenation of ethane. In addition, under certain conditions ethane can be dissociated into two methyl radicals. In the third step, acetylene and propylene are formed from ethylene via radical chain dehydrogenation and radical chain methylation reactions, respectively. At the same time, a sharp increase in the formation rate of ethane is observed. Finally, the formation of benzene occurs from acetylene and ethylene, and even if both hydrocarbons can form carbon directly, benzene and probably higher condensed aromatics are the main species for carbon growth. Regardless of the reaction temperature, the rate-limiting step is the decomposition of methane into a methyl radical and a hydrogen atom (at T<1400° C.) or the decomposition of methane into methylene and a hydrogen molecule (at T>1400° C.). In one or more embodiments of the present disclosure, at least some of the thermal energy needed for noncatalytic decomposition of methane is provided by the waste heat transferred from the fuel cell, the hydraulic pumping units and any other machinery producing heat when pumping hydraulic fracturing.

Further, a lower temperature requirement and therefore a lower energy requirement can be achieved using a catalyst in the decomposition of methane. In this case, methane reacts with a catalyst to form hydrogen gas and solid carbon. The catalyst can help break the carbon-hydrogen bonds of the methane to produce hydrogen gas and solid carbon as shown in Reaction 1 below.

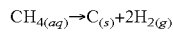  Reaction 1

The catalyst can be a metal, a metal alloy, a metal salt, or liquid metal. As used herein, the term "metal alloy" means a mixture of two or more elements, wherein at least one of the elements is a metal. The other element(s) can be a non-metal or a different metal. An example of a metal and non-metal alloy is steel, comprising the metal element iron and the non-metal element carbon. An example of a metal and metal alloy comprises bronze, comprising the metallic elements copper and tin. As used herein, the term "metal" means any substance that comprises a metal as a primary component (e.g., >50%) and includes pure metals and metal alloys. The catalyst can include pure metals or metal alloys, such as copper, nickel, cobalt, iron, manganese, chromium, vanadium, palladium, platinum, gold, silver, ruthenium, rhodium, iridium, or combinations thereof. A catalyst metal alloy can also include any of the aforementioned metals alloyed with a non-metal. The catalyst can also be a salt of any of the aforementioned metals. The metal salt may include metal chloride, metal fluoride, metal bromide, metal iodide, metal nitrate, metal triflate, or combinations thereof. By way of example, the metal of the metal salt may include a silver salt, such as silver chloride, silver fluoride, silver bromide, silver iodide, silver triflate, or combinations thereof. The metal of the catalyst can include a post-transition metal. The post-transition metal may include aluminum, gallium, indium, thallium, tin, bismuth, or combinations thereof. The post-transition metal may be alloyed with an alkali metal, alkaline earth metal, actinide metal, lanthanide metal, transition metal, or combinations thereof.

The catalyst may be a solid. The catalyst may include a plurality of solid particles. The catalyst can have any suitable particle size, including a mean particle size of about 10 micrometers or less. For example, the catalyst can have a mean particle size in the range of about 10 nanometers to about 100 nanometers (about 0.01 micrometers to about 1 micrometers). The mean particle size of the catalyst can be selected such that an increased surface area is available for reacting with the captured methane.

The catalyst may be carried in a plurality of carrier droplets. The carrier droplets can comprise a metal. The metal can be in liquid form. At temperatures above 30° C., gallium melts into a liquid. This liquid metal is suspended and agitated/sonicated/mixed in a solvent to transform it into micron-sized liquid metal droplets. The metal for the carrier droplets may include a post-transition metal. The metal for the carrier droplets may include aluminum, gallium, indium, thallium, tin, bismuth, or combinations thereof. The post-transition metal can also be alloyed with an alkali metal, alkaline earth metal, actinide metal, lanthanide metal, transition metal, or combinations thereof. The plurality of carrier droplets can have any suitable size, including a mean diameter of about 100 micrometers or less. For example, the plurality of carrier droplets can have a mean diameter in the range of about 0.1 micrometers to about 50 micrometers. It is to be understood that the use of the term droplet does not limit the liquid droplets to any particular shape (e.g., spherical) or require each droplet to have uniform dimensions. Moreover, any uniform dimensions and shape can also change during agitation in the reaction chamber.

The plurality of carrier droplets can include a metal that has a melting point of about 300° C., about 200° C., about 150° C., about 100° C., or about 60° C., or less. According to any of the embodiments, the metal of the plurality of carrier droplets has a melting point less than or equal to ambient temperature (75° F. (24° C.)). By way of example, pure gallium has a melting point of about 30° C. and alloys of gallium with other metals can have a melting point close to 24° C. In other embodiments, liquid metallic tin can achieve high activity in producing hydrogen from methane decomposition acting as a heat-transfer medium. Therefore, the addition of a second or even third metal via allowing can enhance the catalytic performance. Further, the produced solid carbon is insoluble in the liquid metal melt and due to buoyancy accumulates on the surface of the melt, facilitating easy solid carbon collection. Consequently, liquid metal catalysts are elevated from a heat-transfer medium to a catalytic role through alloying. For instance, Cu—Bi catalyst was optimized at an intermediate stochiometric ratio of 0.45 to 0.55 mol of Cu—Bi. In some embodiments, the carrier droplets include Ni—Bi catalysts, wherein the Ni—Bi catalysts are solid particles suspended in liquid metal carrier droplet.

While improvements have been made to reduce the operating temperature of methane decomposition, current methane decomposition still requires operating temperatures above 500° C. even with the availability of new catalysts. However, the heat produced by the fuel cell, the hydraulic pumping units, and/or other machinery on location to pump hydraulic fracturing fluids downhole can be recovered as a heat source for the methane pyrolysis. For example, the heat may be recorded, for example, to pre-heat the methane inlet and pre-heat the at least one or more reaction systems that convert the captured methane into hydrogen gas and solid carbon. The system in accordance with some embodiments of the present disclosure comprises a methane pre-heater, a reaction system in fluid communication with the methane preheater, wherein the reaction system comprises one or more reaction chambers containing a catalyst (e.g., carrier droplets containing a hydrogen storage system in fluid communication with the hydrogen storage system, and a waste heat recovery unit configured to supply heat from the hydrogen fuel cell to the methane preheater.

In some embodiments, the catalyst may be dispersed in a liquid base fluid. For example, the reaction chamber may include a liquid base fluid. By way of further example, the liquid base fluid may form a continuous phase within the reaction chamber wherein the plurality of carrier droplets, the catalyst, and the methane may be a dispersed phase within the liquid base fluid. According to any of the embodiments, the liquid base fluid does not solubilize or negligibly solubilizes the catalyst (e.g., solid catalyst particles) or the plurality of carrier droplets. In general, the liquid base fluid should not be consumed by, or take part in, the reaction of the catalyst and the methane. The liquid base fluid can be, for example, an ionic liquid or an organic liquid. Examples of ionic liquids include 1-alkyl-3-methylimidazolium, 1-alkyl-1-pyrrolidinium, 1-alkylpyridinium, trialkylsulfonium, n-alkylphosphonium, tetraalkylammonium, tetraalkylphosphonium, dicyanamide, acetate, halogen, trifluoroacetate, hexafluorophosphate, tetrafluoroborate, alkyl sulfonate, alkyl sulfate, alkyl phosphate, bis(trifluoromethylsulfonyl) imide, or combinations thereof. Examples of organic liquids include alkanolamines, dimethylformamide, acetonitrile, cyclohexane, diethylene glycol dimethyl ether, ethylene glycol, glycerol, 2-amino-2-methyl-1-propanol, benzylamine, piperazine, 1,2-ethanediamine, 3-methylamine propylamine, pyridine, triethylamine, xylene, propanol, butanol, ethanol, methanol, acetone, methyl acetate, acetylacetone, 1,4-dioxane, 2-methoxyethyl acetate, N,N-dimethylacetamide, 2-butoxyethyl acetate, N-tert-butylformamide, 2-(2-butoxyethoxy)ethyl acetate, formamide, poly(ethylene glycol), carbonate (such as sodium, potassium or calcium carbonate), bicarbonate (such as sodium or potassium bicarbonate etc.), or combination thereof. The liquid base fluid may also include water or mixture of any two or more of disclosed liquids. In some embodiments, the liquid base fluid includes a non-polar solvent since methane gas is a non-polar fluid. A non-polar liquid base solvent enhances the solubility of methane gas in the liquid base fluid. Some examples of non-polar solvents include alkanes, chloroform, carbon tetrachloride, diethyl ether, toluene, xylene, and 1,4-dioxane.

In some embodiments, the liquid base fluid further includes one or more surfactants. For example, the one or more surfactants may be included in the reaction chamber. The surfactant can enhance dispersion of the plurality of carrier droplets throughout the liquid base fluid. Examples of suitable surfactants may be anionic, cationic, or non-ionic.

The catalyst, the plurality of carrier droplets, and the liquid base fluid can be added to the chamber of the reaction chamber at the same time or different times. By way of example, the liquid base fluid, the catalyst, and the liquid metal carrier droplets can be pre-mixed in a separate container to allow the liquid metal to form a dispersion of fine droplets suspended in the liquid base fluid, and then this dispersion can be added to the chamber of the reaction chamber. The catalyst, the plurality of carrier droplets, and the liquid base fluid can be agitated. Any form of mechanical agitation can be applied to the contents in the reaction chamber to ensure dispersion of the liquid metal carrier into fine droplets in the liquid base fluid. Examples of mechanical agitation include, but are not limited to, sonication, vibration, homogenization, rapid stirring, blending, or mixing. The reaction chamber may also include an agitator, for example a motor and one or more mixing blades, to agitate the contents in the reaction chamber.

The plurality of carrier droplets may be a carrier for the catalyst. Particles of the catalyst may have an affinity for the plurality of carrier droplets and can coat the outside of the droplets and also become intermixed within the droplets. The amount of agitation of the contents in the reaction chamber can be selected such that the liquid metal carrier droplets have desired dimensions. By way of example, increased agitation can produce droplets having smaller dimensions than lower agitation. The dimensions of the droplets and the concentration of the carrier droplets can provide a desired surface area of the plurality of carrier droplets, which increases the surface area of the catalyst particles that react with the injected methane. The liquid base fluid can help disperse the carrier droplets with the help of mechanical agitation. Particles of the catalyst are dispersed in the liquid metal. The carrier droplets can prevent coking or coating of solid carbon (produced from methane reduction) on the catalyst nanoparticles and the droplets themselves, thereby allowing fresh surfaces of catalyst to react with the methane dissolved in the liquid base solvent. The small size of the droplets provides large surface areas for the catalytic sites between the catalyst and methane. The low density of produced solid carbon and the smooth surface of droplets enhance detachment of produced solid carbon from the droplets, allowing it to float to the top of the reaction chamber to be separated and collected. The solid carbon can be in the form of particulates. The solid carbon can float to the top of the liquid base fluid in the reaction chamber.

The mechanical agitation may be continuously applied to the contents in the reaction chamber during the reaction time (i.e., the length of time that the captured methane is in contact with carrier droplets and the catalyst). Continuous agitation can be used to keep the carrier (e.g., liquid metal) as a plurality of droplets in the dispersion, prevent the plurality of carrier droplets from coalescing, enhance detachment of the solid carbon particulates from the surfaces of the plurality of carrier droplets, and cause the solid carbon to float to the top of the liquid base fluid in the reaction chamber where it will be easier to be separated.

The methane can be introduced into the bottom of the reaction chamber via an inlet. The inlet can include a diffuser that causes the methane to enter the reaction chamber as bubbles. Bubbled methane can more easily react with the catalyst carried by the carrier droplets as the methane rises to the top of the reaction chamber. The inlet can include one or more components that can control the flow rate and amount of the captured methane that is being introduced into the reaction chamber. There can also be more than one inlet that is used to introduce the methane into the reaction chamber. The inner diameter of the one or more inlets can be selected such that a desired flow rate of the captured methane into the reaction chamber can be achieved.

As previously described, the hydrogen generated from methane decomposition may be supplied to a fuel cell in accordance with one or more embodiments for generation of electricity. The fuel cells may be stationary or mobile. The electricity generated by the fuel cells may be used for any suitable purpose. In some embodiments, the fuel cells may be used to power well equipment, such as fracturing equipment at a well stimulation site. The fuel cells may be coupled to the well equipment via a DC/AC converter and, in some embodiments, via a variable frequency drive (VFD). The fuel cells may be arranged in a fuel cell stack that is used to generate electricity to power various electrical devices (e.g., electric motors) on the well equipment. For example, the fuel cells may be coupled to electric motors on pumping units and used to drive hydraulic pumps on the pumping units, thereby pumping fracturing fluid to a wellhead at a desired pressure. The hydraulic pumping units may include one or more reciprocating pumps, centrifugal pumps, vane pumps, or other types of pumps. Fuel cells may be used to power other equipment on location as well, including a blender unit, a gel/ADP mixer unit, sand handling equipment, liquid handling equipment, a control center (e.g., tech center), and others. The well equipment may be driven partially or entirely by electrical power generated using the fuel cells, as opposed to diesel engines that are conventionally used on location.

The waste heat generated by the fuel cells and/or the well equipment may be captured in a waste heat recovery unit in accordance with one or more embodiments. The waste heat recovery unity may include, for example, one or more heat exchanger. For example, a heat exchanger(s) may recover waste heat from the fuel cell for use in the methane decomposition. By way of example, an additional heat exchanger (s) may recover waste heat from the well equipment for use in the methane decomposition. The heat recovered in the waste heat recovery unity may be transferred, for example, to any suitable heat transfer medium such as a heat transfer fluid (liquid or gas), a solid conductive material, or electromagnetic waves. For example, the thermal energy can be transported using any suitable heat transfer liquid such as hydrocarbon oil, or synthetic oil, molten salts, and molten metals, or silicon-based fluids, as well as but also gases such as water vapor, nitrogen, argon, or helium. Additional heat transfer liquids such as liquid water, glycol-based liquid or any other heavy-duty antifreeze liquid can also be used in additional examples.

While the preceding descriptions describes the use of methane gas released from a wellhead, present embodiments are not limited to use of methane from a wellhead. Rather, any suitable source of methane may be used for methane decomposition. Examples of suitable methane sources include, but are not limited to, captured methane from the wellhead, captured methane from landfills, captured methane from cattle and dairy farms, or captured methane from steam methane reforming. In some embodiments, methane gas from a wellhead may be supplemented with additional fuel delivered to the location. In some embodiments, the methane gas may include waste gas this is typically flared.

FIG. 1 is a schematic illustration of system 100 in accordance with some embodiments of the present disclosure. As illustrated, the system 100 includes a methane decomposition unit 102, a hydrogen fuel cell 104, and a heat recovery unit 106. In the illustrated embodiment, methane supply 108 provides methane to the methane decomposition unit 102 for decomposition of methane. The methane may be from any suitable source include methane captured gas from a well or additional fuel supplied to the location. In the methane decomposition unit 102, the methane may be decomposed into solid carbon and hydrogen gas. The methane decomposition unit 102 may include preheaters, reaction chambers, and other suitable equipment as described herein for decomposition of the methane. As illustrated, the solid carbon may be withdrawn from the methane decomposition unit 102 as carbon product 110 while the hydrogen gas may be supplied via hydrogen line 112 to a hydrogen storage system 114 in fluid communication with the methane decomposition unit 102.

The hydrogen storage system 114 may include storage cylinders or other suitable storage tanks for storing the hydrogen gas from the decomposition. Storage tanks for the hydrogen can be any tank made of material such as metal, carbon fiber, resin, capable of storing hydrogen gas without any leak and without reacting with hydrogen gas. The hydrogen storage system 114 is in fluid communication with the hydrogen fuel cell 104. While the present embodiment shows the hydrogen storage system 114, other embodiments may not utilize hydrogen storage between methane decomposition and electricity generation, but hydrogen storage system 114 may be used, for example, to allow for process upsets with a steady supply of hydrogen to the hydrogen fuel supply 104. In addition, additional hydrogen gas may be supplemented to the hydrogen storage system 114 and/or the hydrogen fuel cell 104 in addition to the hydrogen gas generated in the methane decomposition unit 102.

Hydrogen gas from the hydrogen storage system 114 may be supplied to the hydrogen fuel cell 104 by way of supply line 116. The hydrogen fuel cell 104 may produce electricity 120 when hydrogen gas is combined with oxygen. In the illustrated embodiment, oxygen is provided to the hydrogen fuel cell 104 by oxygen supply 118. The oxygen supply 118 may include any suitable source of oxygen, including pure oxygen, oxygen-enriched air (>21% mole % oxygen), and air, among others. In addition to the electricity 120, the hydrogen fuel cell 104 may also produce water 122 and waste heat 124. The electricity 120 may be provided to an electricity consumer 126, which may be any suitable consumer of electricity, including, well equipment (e.g., pumping equipment) or other suitable electric devices.

The waste heat 124 from the hydrogen fuel cell 104 may be provided to a heat recovery unit 106 so that it can be recovered to reduce the heat requirements for the methane decomposition unit 102. The heat recovery unit 106 may use any suitable technique for recovering the waste heat 124. For example, the heat recovery unit 106 may include one or more heat exchangers, which can recover the heat into any suitable heat transfer medium as previously described. The recovered heat from the heat recovery unit 106 may be provided to the methane decomposition unit 102 by way of a heat transfer fluid line 128. Additional waste heat 130 may also be recovered from the electricity consumer 126. The additional waste heat 130 may utilize the same heat transfer equipment for recovery of the waste heat 124 from the hydrogen fuel cell 104 or the additional waste heat 130 may utilize additional equipment (e.g., additional heat exchangers) for heat recovery. The heat recovered from the additional waste heat 130 may also be used to reduce the heat requirement of the methane decomposition unit 102.

Figure 2:
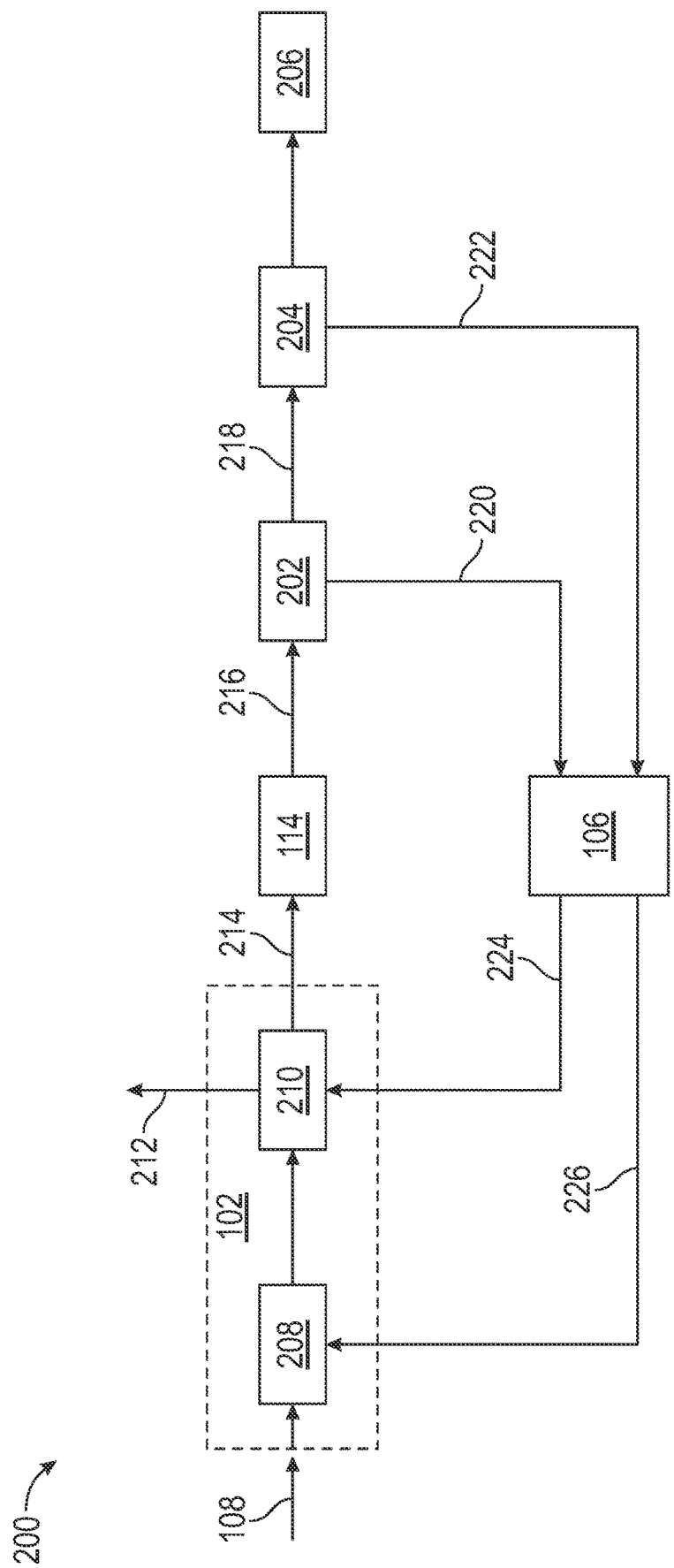
FIG. 2 is a schematic illustration of a system in accordance with some embodiments of the present disclosure.

FIG. 2 is a schematic illustration of a system 200 in accordance with some embodiments of the present disclosure. System 200 comprises a methane supply 108, a methane decomposition unit 102, a hydrogen storage system 114, a hydrogen fuel cell 202, pumping equipment 204 in fluid communication with a wellhead 206. The methane decomposition unit 102 includes a methane pre-heater 208 and at least one or more reaction chambers 210 in fluid communication with the hydrogen storage system 114.

Methane supply 108 is injected into the methane decomposition unit 102 using a methane injector in fluid communication with at least one or more reaction chambers 210 wherein methane decomposition is performed. The methane injector can be any type of injector suitable for injecting methane at low to high pressures and at ambient to high temperatures. The methane injector may be any type of diffuser as mentioned above or any type of coaxial injector or any type of screw swirl injector, for instance.

The one or more reaction chambers 210 may be any type of reaction chamber capable of providing temperatures from 400° C. to above 1400° C. under a certain pressure through any type of heater with a methane inlet, preferably at the bottom of reaction chamber 212. Methane decomposition in reaction chamber 210 produces solid carbon 212 through a solid carbon outlet, and hydrogen 214 through a hydrogen outlet, preferably at the top of reaction chamber 210, in fluid communication with hydrogen storage system 114. Reaction chamber 210 is a leak-free chamber and can contain any type of fluid with methane gas and a liquid metal catalyst for instance to conduct methane decomposition to produce solid carbon 212 and hydrogen gas 214.

Hydrogen storage system 114 includes a hydrogen storage tank, which can be any tank made of material such as metal, carbon fiber, resin, capable of storing hydrogen without any leak and without reacting with hydrogen at low pressures or high pressures and at low temperatures or ambient temperature. Hydrogen gas 216 from hydrogen storage tank 114 is then injected into a hydrogen fuel cell 202 producing electricity 218 and waste heat 220. Electricity 218 is used to power pumping equipment 204 to pump hydraulic fracturing fluids, for instance, to the wellhead 206. Waste heat 222 is also generated by pumping equipment 204. Waste heat 220 generated by fuel cell 202 and waste heat 222 generated by pumping equipment 204 can be recovered through a heat transfer medium. Heat transfer medium is part of the heat recovery unit 106 that pre-heats reaction chamber 212 through line 224 and methane pre-heater 210 through line 226, respectively.

As described above, the heat transfer from fuel cell 202 and pumping equipment 204 can be accomplished by any suitable heat recovery unit 106 including any suitable heat transfer medium such as a heat transfer fluid (liquid or gas), a solid conductive material, or electromagnetic waves. For example, the thermal energy can be transported using any high-temperature heat transfer liquid such as hydrocarbon oil or synthetic oil, molten salts and molten metals, silicon-based fluids but also gases such as water vapor, nitrogen, argon, or helium. Lower temperature heat transfer liquid such as liquid water, glycol-based liquid or any other heavy-duty antifreeze liquid can also be used in additional example.

Pumping equipment 204 may be any type of electrically powered fracturing pumping equipment capable of injecting hydraulic fracturing fluids at high pressures such as any reciprocating positive displacement pump with a fluid end and a power end. Pumping units 206 may be any electrically powered triplex pumps or any electrically powered quintuplex pumps for instance. Hydrogen fuel cell 202 can be any fuel cell producing electricity 218 from hydrogen and air (or relatively pure oxygen) releasing pure water (not shown) and waste heat 220. Hydrogen fuel cell 202 may be any polymer electrolyte membrane fuel cell, alkaline fuel cell, or phosphoric acid fuel cell, for instance.

Figure 3:
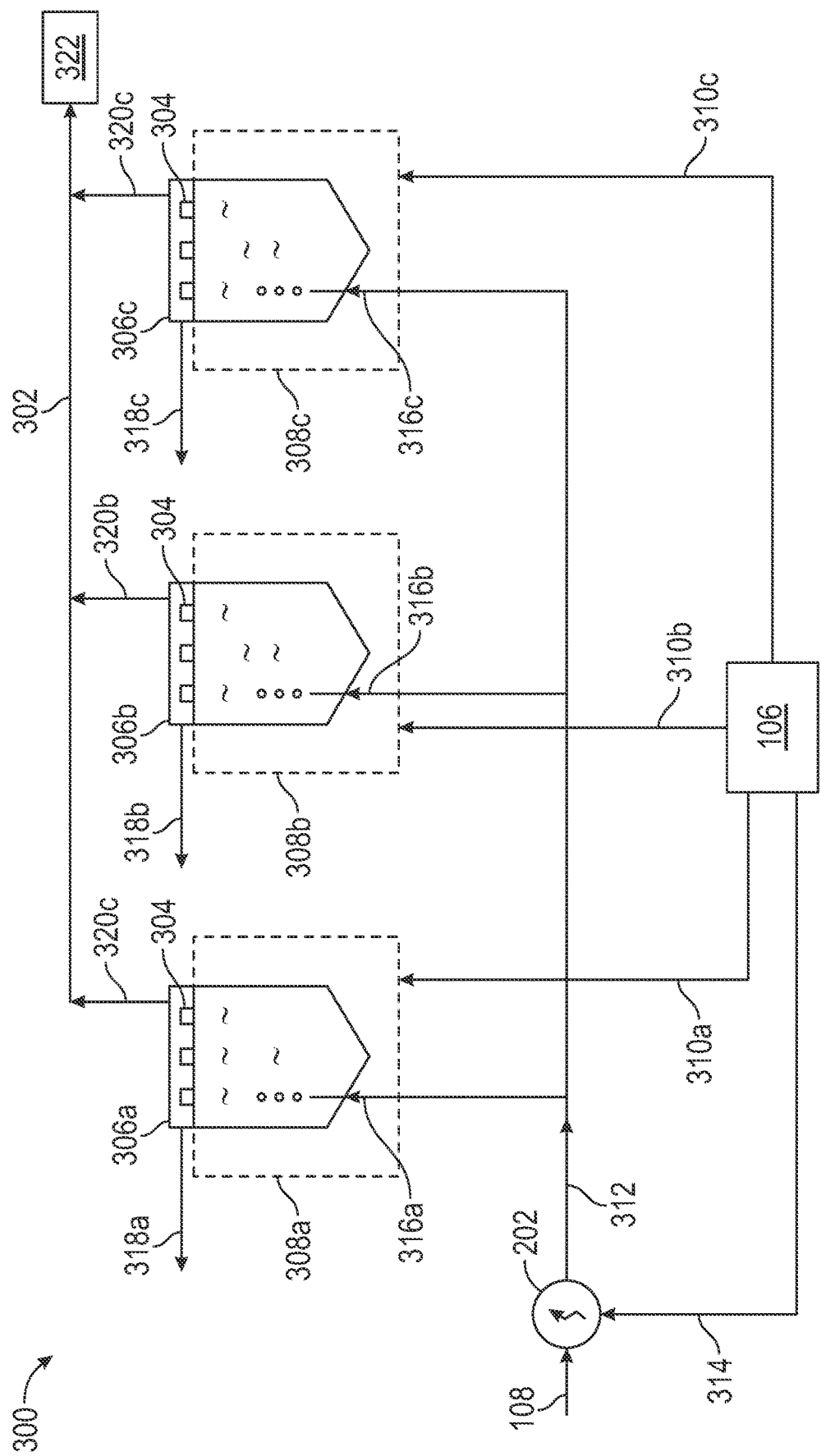
FIG. 3 is a schematic illustration of reaction chambers for converting captured methane into hydrogen gas and solid carbon according to some embodiments of the present disclosure.

FIG. 3 is a schematic illustration of a reaction system 300 for methane decomposition for conversion of methane from methane supply 108 to hydrogen gas 302 and solid carbon 304 in accordance with one or more embodiments. Reaction system 300 includes a plurality of reaction chambers, identified on FIG. 3 as first reaction chamber 306a, second reaction chamber 306b, and third reaction chamber 306c, surrounded by reaction chamber heater 308a, reaction chamber heater 308b, and reaction chamber heater 308c, respectively. Reaction chamber heater 308a, 308b, and 308c may be any suitable reaction chamber heater including any furnace or heating element capable of providing temperatures from 400° C. to above 1400° C. Reaction chamber 306a, 306b, and 306c may be pre-heated by a heat transfer medium 310a, 310b, and 310c, respectively, circulating through heat recovery unit 106. As described above, the heat transfer from the fuel cell, the pumping equipment, or any other electricity consumer can be accomplished by any suitable heat transfer medium such as a heat transfer fluid (liquid or gas), a solid conductive material, or electromagnetic waves. For example, the thermal energy can be transported using any high-temperature heat transfer liquid such as hydrocarbon oil or synthetic oil, molten salts and molten metals, silicon-based fluids but also gases such as water vapor, nitrogen, argon, or helium. Lower temperature heat transfer liquid such as liquid water, glycol-based liquid or any other heavy-duty antifreeze liquid can also be used in additional example.

In the illustrated embodiment, methane may be provided from any suitable methane supply 108 to methane pre-heater 202 where it is preheated. The preheated methane 312 may then be supplied to the first reaction chamber 306a, second reaction chamber 306b, and third reaction chamber 306c. Examples of suitable methane sources include, but are not limited to, captured methane from the wellhead, captured methane from landfills, captured methane from cattle and dairy farms, or captured methane from steam methane reforming. As described above, methane pre-heater 202 may be pre-heated by at least a portion of the heat transfer medium 314. Preheated methane 312 is introduced after pre-heating into the bottom of first reaction chamber 306a, second reaction chamber 306b, and third reaction chamber 306c via inlet 316a, 316b, and 316c, respectively. Inlets 312a, 312b, and 312c can include a diffuser (not shown) that causes the methane 302 to enter reaction chamber 308a, 308b, and 308c as bubbles as illustrated in FIG. 3. Bubbled methane can more easily react with the catalyst on the plurality of liquid metal carrier droplets as the methane 302 rises to the top of first reaction chamber 308a, second reaction chamber 308b, and third reaction chamber 308c, respectively. Inlet 316a, 316b, and 316c can include one or more components that can control the flow rate and amount of preheated methane 312 that is being introduced into first reaction chamber 306a, second reaction chamber 306b, and third reaction chamber 306c. There can also be more than one inlet (not shown) that is used to introduce preheated methane 312 into first reaction chamber 306a, second reaction chamber 306b, and third reaction chamber 306c.

Reaction chamber 306a, 306b, and 306c, can include a first outlet 318a, 318b, and 318c, respectively, located adjacent to the surface of the liquid base fluid. Thus, the produced solid carbon 304 can be removed by drawing the top portion of the liquid base fluid, liquid metal carrier droplets, catalyst, solid carbon mixture into first outlet 318a, 318b, and 318c. It is to be understood that some or all of the following may be located at the surface of the liquid within the chamber: the liquid base fluid, the surfactant if used, a portion of the carrier droplets, the catalyst, and solid carbon 304. Accordingly, only the liquid base fluid and the solid carbon 304 may be located at the surface of the liquid in some instances, while in other instances a portion of the liquid metal carrier droplets can also be located at the surface. The solid carbon 304 can be separated from the liquid base fluid and carrier droplets and catalyst in a separator (not shown) after being removed from reaction chamber 306a, 306b, and 306c. The solid carbon 304 can then be stored in a storage vessel. Reaction chamber 306a, 306b, and 306c can also include a second outlet 320a, 320b, and 320c, respectively. Second outlets 320a, 320b, and 320c can be located at the top of their respective chambers. The produced hydrogen gas 302 and any unreacted methane can be located at the top of the chamber and can be withdrawn from the reaction chamber via second outlet 320a, 320b, and 320c into hydrogen storage tank 322. Produced hydrogen gas 302 and unreacted methane may need to be separated in a separator (not shown) before storing hydrogen 302 into hydrogen storage tank 322.

According to any of the embodiments, any or all of the following can be modified to achieve a desired efficiency of converting methane to hydrogen gas 302 and solid carbon 306: the dimensions of reaction chamber 306a, 306b, and 306c, the concentration of the liquid base fluid, the concentration of the carrier droplets, the concentration of the catalyst, the flow rate of the preheated methane 312 to first reaction chamber 306a, second reaction chamber 306b, and third reaction chamber 306c, and the type, duration, and force of the mechanical agitation. The desired efficiency can range from 50% to 90%.

As can be seen in FIG. 3, there can be more than one reaction chamber connected in parallel or in series. When first reaction chamber 306a, second reaction chamber 306b, and third reaction chamber 306c are connected in series according to one or more embodiments, the preheated methane 312 can be bubbled up through first reaction chamber 306a. After the desired reaction time, the top portion of liquid base fluid, solid carbon 304, liquid metal carrier droplets, catalyst, or combinations thereof can be removed from first reaction chamber 306a via first outlet 318a. The produced hydrogen gas 302 and any unreacted methane can be removed from the reaction chamber via second outlet 320a. The solid carbon 304 can be separated from the liquid base fluid, carrier droplets, and/or catalyst via a separator and then stored in a carbon storage vessel (not shown). The liquid base fluid, carrier droplets, and/or catalyst that has been separated from the solid carbon 304 can then be introduced into second reaction chamber 306b via an inlet (not shown). The hydrogen gas and unreacted methane can then be flowed from first reaction chamber 306a into second reaction chamber 306b via an inlet located at the bottom of the second reaction chamber (not shown). Second reaction chamber 306b can include the liquid base fluid, plurality of carrier droplets, and catalyst particles. The process used in first reaction chamber 306a for reacting preheated methane 312 with the catalyst can be used in second reaction chamber 306b, third reaction chamber 306c, and so on. Each of the additional reaction chambers can have the same components (e.g., inlet, outlets, agitator, etc.) as the first reaction chamber. In this manner, the desired efficiency of converting the preheated methane 312 into hydrogen gas 302 and solid carbon 304 can be achieved. The hydrogen gas 302 can then be stored in a hydrogen storage tank 322.

Statement 1. A method comprising: decomposing methane to produce at least hydrogen; introducing at least a portion of the hydrogen to a fuel cell to generate at least electricity and heat; and capturing at least a portion of the heat from the fuel cell to reduce an electricity requirement for the decomposing.

Statement 2. The method of statement 1, wherein the decomposition of methane comprises: reacting the methane with a catalyst, wherein the methane is introduced into a reaction chamber containing a liquid base fluid, carrier droplets, and the catalyst.

Statement 3. The method of statement 1 or statement 2, wherein the catalyst comprises a plurality of solid particles selected from the group consisting of a metal, a metal alloy, a salt, and combinations thereof.

Statement 4. The method of any of statements 1-3, wherein the carrier droplets have a mean particle size of about 0.1 micrometers to about 50 micrometers, and wherein solid particles of the catalyst have a mean particle size of about 10 nanometers to about 100 nanometers, and where the particles of the catalyst are carried in the carrier droplets.

Statement 5. The method of any of statements 1-4, wherein the carrier droplets comprise a pure metal or a metal alloy comprising a post-transition metal selected from the group consisting of aluminum, gallium, indium, thallium, tin, bismuth, and combinations thereof.

Statement 6. The method of any of statements 1-5, wherein the catalyst is carried by the carrier droplets, wherein the carrier droplets comprise a post-transition metal alloyed with an alkali metal, alkaline earth metal, actinide metal, lanthanide metal, transition metal, or combinations thereof.

Statement 7. The method of any of statements 1-6, wherein the carrier droplets comprise a metal that has a melting point of about 150° C. or less, and wherein the liquid base fluid has a temperature greater than the melting point.

Statement 8. The method of any of statements 1-7, further comprising powering well equipment with at least a portion of the electricity from the hydrogen fuel cell.

Statement 9. The method of any of statements 1-8, further comprising recovering at least a portion of additional waste heat from the fracturing equipment to further reduce the electricity requirement for the decomposing.

Statement 10. The method of any of statements 1-9, further comprising powering one or more pumps to deliver a fracturing fluid to a wellhead.

Statement 11. The method of any of statements 1-10, wherein the capturing at least a portion of the heat from the fuel cell comprises heating a heat transfer medium.

Statement 12. The method of any of statements 1-11, further comprising preheating at least a portion of the methane with at least a portion of the captured heat.

Statement 13. A method comprising: reacting methane with a catalyst in one or more reaction chambers to produce at least hydrogen and solid carbon, wherein the one or more reaction chambers each contains a liquid base fluid, carrier droplets, and the catalyst; introducing at least a portion of the hydrogen to a fuel cell to generate at least electricity and heat; pumping a fracturing fluid into a wellbore with one or more pumps powered by at least a portion of the electricity from the fuel cell; and capturing a portion of the heat from the fuel cell and a portion of a waste heat generated from the one or more pumps to preheat at least a portion of the methane prior to the reacting Statement 14. The method of statement 13, wherein the carrier droplets have a mean particle size of about 0.1 micrometers to about 50 micrometers, and wherein solid particles of the catalyst have a mean particle size of about 10 nanometers to about 100 nanometers, and where the particles of the catalyst are carried in the carrier droplets.

Statement 15. The method of statement 13 or statement 14, wherein the catalyst is carried by the carrier droplets, wherein the carrier droplets comprise a post-transition metal alloyed with an alkali metal, alkaline earth metal, actinide metal, lanthanide metal, transition metal, or combinations thereof.

Statement 16. The method of any of statements 13-15, wherein the carrier droplets comprise a metal that has a melting point of about 150° C. or less, and wherein the liquid base fluid has a temperature greater than the melting point.

Statement 17. The method of any of statements 13-16, further comprising preheating at least a portion of the methane with at least a portion of the captured heat.

Statement 18. The method of any of statements 13-17, further comprising heating at least one of the one or more reaction chambers with at least a portion of the captured heat.

Statement 19. A system comprising: a methane preheater; a reaction system in fluid communication with the methane preheater, wherein the reaction system comprises one or more reaction chambers containing a liquid base fluid, carrier droplets and a catalyst, wherein the reaction system is configured to decompose methane; a hydrogen storage system in fluid communication with the reaction system; a hydrogen fuel cell in fluid communication with the hydrogen storage system, wherein the hydrogen fuel cell is configured to generate electricity from hydrogen; and a heat recovery unit configured to supply waste heat from the hydrogen fuel cell to the methane preheater.

Statement 20. The method of statement 19, further comprising one or more pumps fluidly coupled to a wellhead, wherein the one or more pumps use at least a portion of the electricity from the hydrogen fuel cell.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:
    decomposing methane to produce at least hydrogen, wherein the decomposition of methane comprises: reacting the methane with a catalyst, wherein the methane is introduced into a reaction chamber containing a liquid base fluid, carrier droplets, and the catalyst;
    introducing at least a portion of the hydrogen to a fuel cell to generate at least electricity and heat; and
    capturing at least a portion of the heat from the fuel cell to reduce an electricity requirement for the decomposing.

2. The method of claim 1, wherein the catalyst comprises a plurality of solid particles selected from the group consisting of a metal, a metal alloy, a salt, and combinations thereof.

3. The method of claim 1, wherein the carrier droplets have a mean particle size of about 0.1 micrometers to about 50 micrometers, and wherein solid particles of the catalyst have a mean particle size of about 10 nanometers to about 100 nanometers, and where the particles of the catalyst are carried in the carrier droplets.

4. The method of claim 1, wherein the carrier droplets comprise a pure metal or a metal alloy comprising a post-transition metal selected from the group consisting of aluminum, gallium, indium, thallium, tin, bismuth, and combinations thereof.

5. The method of claim 1, wherein the catalyst is carried by the carrier droplets, wherein the carrier droplets comprise a post-transition metal alloyed with an alkali metal, alkaline earth metal, actinide metal, lanthanide metal, transition metal, or combinations thereof.

6. The method of claim 1, wherein the carrier droplets comprise a metal that has a melting point of about 150° C. or less, and wherein the liquid base fluid has a temperature greater than the melting point.

7. The method of claim 1, further comprising powering well equipment with at least a portion of the electricity from the hydrogen fuel cell.

8. The method of claim 7, further comprising recovering at least a portion of additional waste heat from the well equipment to further reduce the electricity requirement for the decomposing.

9. The method of claim 1, further comprising powering one or more pumps to deliver a fracturing fluid to a wellhead.

10. The method of claim 1, wherein the capturing at least a portion of the heat from the fuel cell comprises heating a heat transfer medium.

11. The method of claim 1, further comprising preheating at least a portion of the methane with at least a portion of the captured heat.

12. A method comprising:
reacting methane with a catalyst in one or more reaction chambers to produce at least hydrogen and solid carbon, wherein the one or more reaction chambers each contain a liquid base fluid, carrier droplets, and the catalyst;
introducing at least a portion of the hydrogen to a fuel cell to generate at least electricity and heat;
pumping a fracturing fluid into a wellbore with one or more pumps powered by at least a portion of the electricity from the fuel cell; and
capturing a portion of the heat from the fuel cell and a portion of a waste heat generated from the one or more pumps to preheat at least a portion of the methane prior to the reacting.

13. The method of claim 12, wherein the carrier droplets have a mean particle size of about 0.1 micrometers to about 50 micrometers, and wherein solid particles of the catalyst have a mean particle size of about 10 nanometers to about 100 nanometers, and where the particles of the catalyst are carried in the carrier droplets.

14. The method of claim 13, wherein the catalyst is carried by the carrier droplets, wherein the carrier droplets comprise a post-transition metal alloyed with an alkali metal, alkaline earth metal, actinide metal, lanthanide metal, transition metal, or combinations thereof.

15. The method of claim 13, wherein the carrier droplets comprise a metal that has a melting point of about 150° C. or less, and wherein the liquid base fluid has a temperature greater than the melting point.

16. The method of claim 13, further comprising heating at least one of the one or more reaction chambers with at least a portion of the captured heat.

17. A system comprising:
a methane preheater;
a reaction system in fluid communication with the methane preheater, wherein the reaction system comprises one or more reaction chambers containing a liquid base fluid, carrier droplets and a catalyst, wherein the reaction system is configured to decompose methane;
a hydrogen storage system in fluid communication with the reaction system;
a hydrogen fuel cell in fluid communication with the hydrogen storage system, wherein the hydrogen fuel cell is configured to generate electricity from hydrogen; and
a heat recovery unit configured to supply waste heat from the hydrogen fuel cell to the methane preheater.

18. The system of claim 17, further comprising one or more pumps fluidly coupled to a wellhead, wherein the one or more pumps use at least a portion of the electricity from the hydrogen fuel cell.

* * * * *